Nov. 2, 1943. H. T. R. HANITZ 2,333,563
METALWORKING MACHINE
Filed April 6, 1940 2 Sheets-Sheet 1
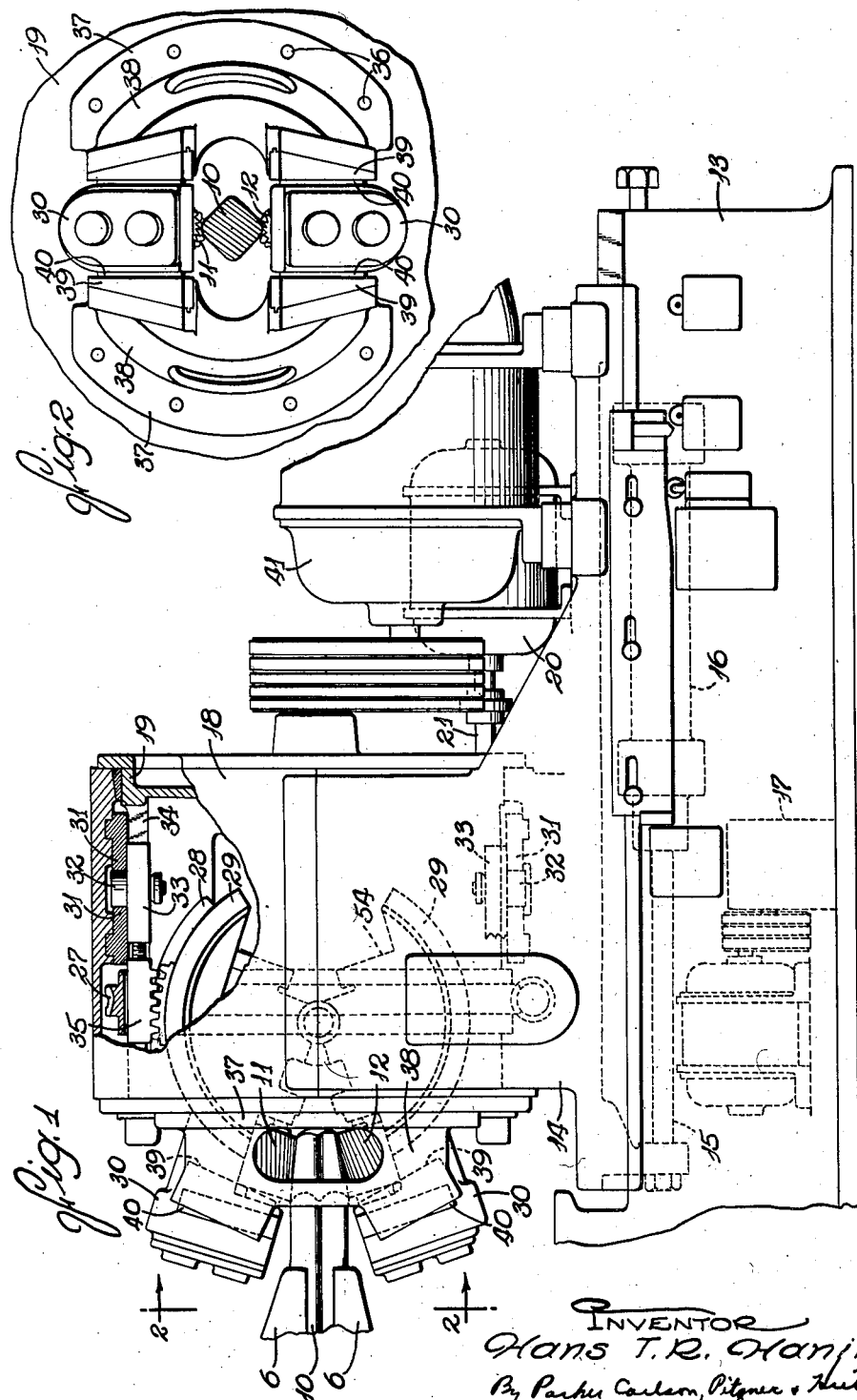
INVENTOR
Hans T. R. Hanitz
By Parker, Carlson, Pitner & Hubbard
ATTORNEYS Nov. 2, 1943.  H. T. R. HANITZ  2,333,563
METALWORKING MACHINE
Filed April 6, 1940  2 Sheets-Sheet 2
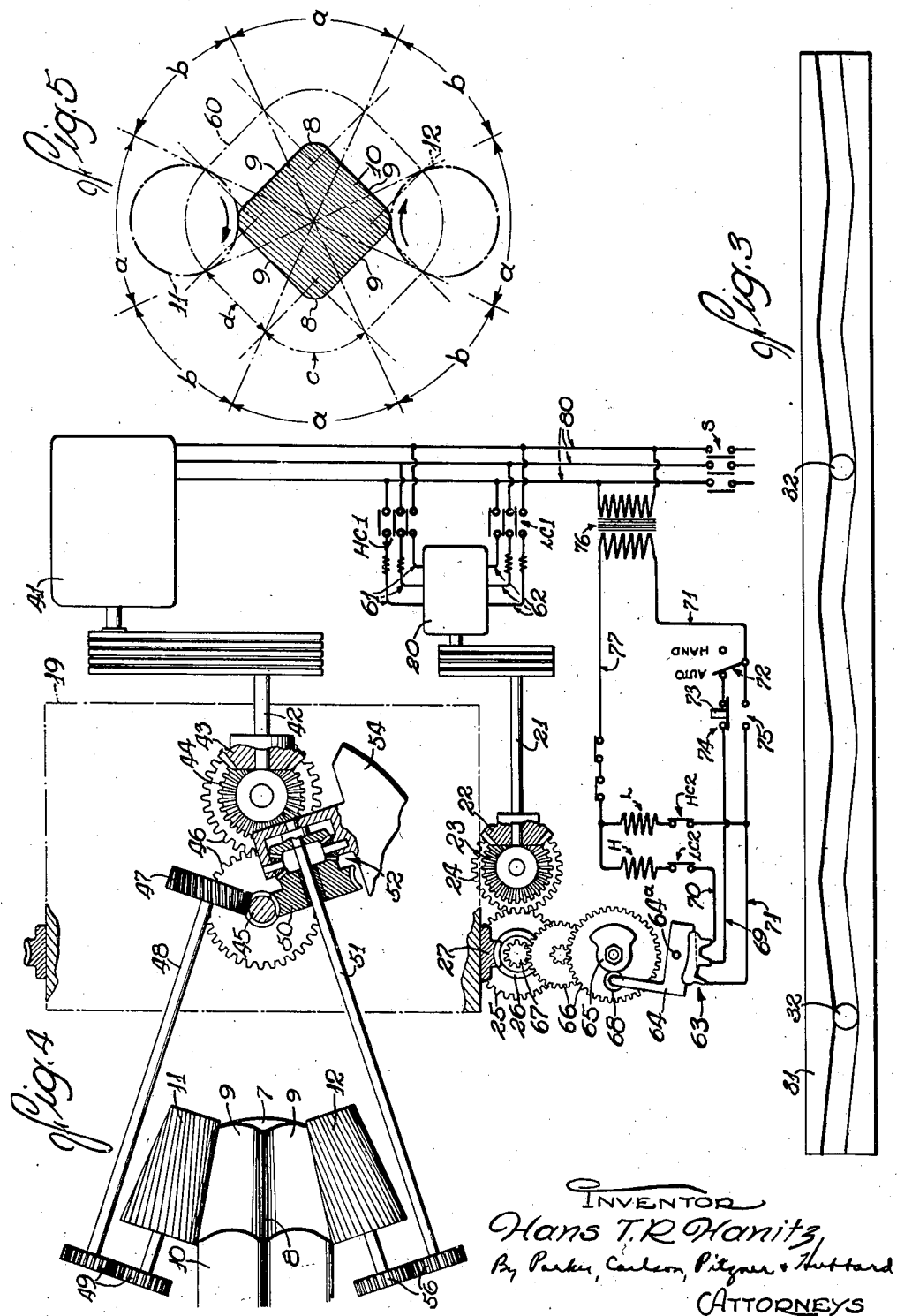
INVENTOR
Hans T. R. Hanitz
By Parker, Carlson, Pitzner & Hubbard
ATTORNEYS Patented Nov. 2, 1943

2,333,563

UNITED STATES PATENT OFFICE 2,333,563

METALWORKING MACHINE

Hans T. R. Hanitz, Rockford, Ill., assignor to The Ingersoll Milling Machine Company, Rockford, Ill., a corporation of Illinois Application April 6, 1940, Serial No. 328,185

7 Claims. (Cl. 90—11)

The invention relates to metal working machines and has particular utility as applied to machines for preparing bars or billets for wire drawing. In general, the presently disclosed machine constitutes an improvement on that described and claimed in Patent No. 2,231,964. The latter patent discloses a machine in which the ends of a bar or billet are given a truncated-pyramidal, beveled-edge shape by pairs of rotary cutters which are revolved bodily about the axis of the bar while being oscillated toward and away from the same in timed relation with such rotation. This timed oscillation of the cutters toward and away from the bar axis results in generating the desired tapered ends of polygonal cross section on the bar and the oscillation is so timed that the edges of the tapered ends of the bar will also be beveled or rounded.

One object of the present invention is to control the relative angular velocities between the cutters and the work piece in a machine of the above character so as to obtain a substantially uniform rate of cutter advance or feed relative to the work piece surface and thereby minimizing torsional stresses on the work piece, and, as a consequence, increasing the uniformity of the finish for a given production capacity.

The invention also resides in the novel character of the means for varying the feed rate during operation of the cutter on different portions of the work piece.

Another object is to provide a novel reinforced mounting for the cutters.

Further objects and advantages of the invention will become apparent as the following description proceeds, in which Figure 1 is a partial side elevation of a machine embodying the invention.

Fig. 2 is a fragmentary end view of the tool head for the machine of Fig. 1.

Fig. 3 is a developed view of a cam included in the machine of Fig. 1.

Fig. 4 is a schematic layout of the drive mechanism and electrical controls therefor.

Fig. 5 is a diagrammatic representation of the cutter movements.

In the particular illustrative construction herein shown (Fig. 1), a wire bar or billet 10 of square cross section is machined to form on it a tapered end of truncated pyramidal form having side faces 9 and beveled edges 8 constituting continuations of the corresponding sides and edges of the intermediate portion. The end of the pyramid is milled off to form a convex end 7.

As described in the aforesaid application, the billet as cast is clamped stationarily between supports 6 while its ends are being pointed. The faces 9 and edges 8 are formed by slab type milling cutters of frusto-conical shape rotating about their own axes while being revolved bodily about the billet axis and simultaneously fed toward and from the latter in proper timed relation. The end surface 7 is formed at the same time by a separate cutter (not shown).

In general, the cutters are mounted on a carriage 14 which is slid along a bed 13 longitudinally toward and away from the bar 10 by suitable feed mechanism, indicated as a hydraulically actuated piston 15 fixed to the carriage and received in a cylinder 16 to which pressure fluid is supplied from a motor driven pump 17. On the carriage 14 is a cylindrical housing 18 in which is journaled a rotatable drum 19, the latter being driven by an electric motor 20 through belts, a shaft 21, bevel gears 22, a stub shaft 23, pick-off gears 24 and 25, and a worm 26 meshing with a worm wheel 27 that encircles the drum 19 and is rigid with it.

Received in semi-circular guides 28 (Fig. 1) in the drum 19 are two oscillatable sectors 29 having yoke shaped projections 30 rotatably supporting opposite ends of the spindles of the cutters 11, 12. These are inclined to the bar 10 axis with their axes substantially intersecting the axis of the bar. To oscillate the sectors 29 in timed relation with the rotation of the drum 19, and thereby form the pyramidal contour, a stationary cam track 31 extending around the interior of the housing 18 (see Figs. 1 and 3) acts on follower rollers 32 on slides 33 which are reciprocable in guides 34 within the drum 19. Racks 35 on these slides mesh with teeth on the sectors 29 and oscillate the sectors 29 and the cutters bodily toward and away from the bar axis. The timing and extent of the cutter oscillation is such that during several revolutions of the drum, the cutters generate faces 9 and edges 8 on the bar end.

To provide rigid lateral support for the cutter yokes 30 during their in and out movements, brackets 38 project from the front of the drum 19 on opposite sides of the cutter yokes with their bases 37 fastened to the drum by bolts 36. The brackets are spherically curved and each is formed with two blocks 39 carrying hardened steel plates 40 the inner surfaces of which bear against and guide the sides of the cutter yokes. By virtue of this arrangement, the yokes 30 are free to oscillate toward and away from each other and ample space is provided for loading of the bar 10 into working position between the cutters 11, 12. At the same time, the outboard portions of the cutter yokes are restrained effectually against lateral deflection. Such a rigid guide arrangement materially increases the quality of finish on the work piece.

A motor 41 on the carriage 14 rotates the cutters 11, 12 about their own axes as they are being revolved about the bar axis. Through belts and a shaft 42 (Fig. 4) coaxial with and journaled on the drum 19, the motor drive is extended to bevel gears 43 and 44 and pick-off gears 46 to a worm 45. The cutter 11 is driven from the worm 45 through a worm wheel 47, a shaft 48 and a pair of gears 49 housed in its supporting yoke 30. In order that the other cutter 12 may be rotated in the same direction, a second worm wheel 50 meshing with the worm 45 is loose on a shaft 51 which it drives through a planetary gearing 52 on a stationary spider 54. The outer end of the shaft 51 is connected to the cutter 12 through gears 56 housed in the associated supporting yoke 30.

Upon reference to the diagrammatic illustration in Fig. 5, it will be observed that cam 31 causes the centers of the cutters 11, 12 to follow a polygonal path 60 concentric with the cross sectional shape of the bar 10. If the cutters are revolved about the bar axis with uniform angular velocity, they will travel at a non-uniform velocity or feed rate relative to the bar surface. That is, they will move much more rapidly over the flat faces 9 of the bar than around the beveled edges 8 resulting in a substantially greater burden on the cutters during milling of the faces.

To obtain a more uniform feed rate in milling the entire polygonal periphery of the billet and thereby increase the production capacity of the machine without subjecting the bar to excessive torsional stress, the invention contemplates feeding the cutters, that is, their centers, at a faster speed when the corners 8 are being milled and the cutter center traverses the paths c through the angles a than during milling of faces 9 which takes place while the cutter center passes through the angles b along the paths d. If the feed rate is to be uniform around the entire periphery of the billet, the speed through each angle a may be increased, over that which obtains as the cutter center traverses the distance d, in the ratio which the length of the path c traversed by the cutter center through the angle a bears to the circumferential length of the corner surface 8.

Means is provided for changing the feed rates automatically at the proper points in each revolution of the cutter drum. To this end, the cutter feed motor 20 is of the well-known two-speed type, having suitable windings (not shown) which, when energized through alternatively available sets of supply leads 61, 62 operate respectively at their corresponding high and low speeds. The automatic control includes a pair of selector relays having energizing windings H and L, as well as corresponding main contacts HC1 and LC1 arranged to close, respectively, the high and low speed energizing circuits 61, 62 for the motor 20. Interlock contacts HC2 and LC2 are also provided on respective ones of these relays in series with the energizing windings for the opposite ones of the pair so as to prevent simultaneous energization.

Control of the selector relays is effected by a pivotally mounted mercury type selector switch 63 actuated, in the present instance, by a replaceable, single lobe cam 65 driven through a gear train 66 by pinion 67 fixed on the drum driving worm 26. Thus, the cam 65 is revolved in timed relation with the rotation of the drum and actuates a follower roller 68 on an arm 64 pivoted at 64a and carrying the switch 63. When the switch is swung to the right (Fig. 4) it connects conductors 69 and 70 and, similarly, when tilted to the left closes a circuit between conductors 69, 71.

Also included in the control system is a two-position selector switch 72 shiftable to either its "auto" or "hand" positions to condition the circuit, respectively, for automatic or hand control of the machine. Associated with this selector switch is a jog switch 73 of the hold-down type normally biased to close its contacts 74 interposed in the conductor 69 and alternatively shiftable to close its contacts 75 interposed in the conductor 71. Energizing current for both the drive and feed motors 41 and 20 is furnished from alternating current supply lines 80 and current is furnished to the control system from these same supply lines through a suitable step-down transformer 76.

To condition the machine for automatic cycle operation the selector switch 72 (Fig. 4) is shifted to its "auto" position as shown and operation of the machine initiated by closing the main supply switch S. Thereupon, the drive motor 41 is started, to rotate the cutters 11, 12 about their own axes through the drive connection described. Additionally, the feed motor 20 is started through energization of one or the other of the selector relays H or L, depending upon the position of the cutters with respect to the work piece at the instant of starting. In the event that the parts are positioned, say, as shown in Fig. 4 at starting, the switch 63 is, it will be observed, tilted to interconnect conductors 69, 70 so that the high speed relay H is energized. The feed motor 20 thus runs at its high speed and drives the drum 19 at a corresponding rate so that the cutters 11, 12 are fed rapidly about the corners of the bar 10 through the angular distance a (Fig. 5). Then, as the cutters begin to move in onto the flat sides of the bar, the cam 65 tilts the automatic selector switch 63 to the left so that it disconnects the conductors 69, 70 and connects conductors 69, 71. Thereupon, the high speed relay is dropped out and the winding L of the low speed relay is energized. The speed of the feed motor 20 is thus dropped to its low range and it continues to revolve the drum 19 at their lower speed as the cutters 11, 12 pass through the succeeding angular distance b in generating the corresponding flat faces on the bar. This cycle of change of speeds is repeated and continued as the cutters move about the bar in scalping from it a spiral layer of metal to shape the desired tapered end.

To stop the cutter feed at any time, the selector 72 is shifted to its "hand" position, thereby dropping out the relays H, L to stop the motor 20. If, on the other hand, the operator wishes simply to eliminate the fast-speed steps in the cycle and have the cutters continue to revolve steadily at their low speed, he leaves the selector 72 in its "auto" position but depresses the jog switch 73. Thereupon, the high speed relay winding H is open-circuited by opening of the contacts 74 but the low-speed relay is picked up. Since the circuit is, in this case, independent of the cycle switch 63, the motor 20 will continue its low-speed operation without interruption so long as the jog switch is held down. Similarly, the jog switch 73 can be used to start and maintain the motor 20 in operation when the selector 72 is in its "hand" position. In such case, the switch 73 functions as an ordinary hold-down jog switch, serving to retain the motor 20 operating at low-speed only so long as the switch is held down and stopping the motor as soon as the switch is released. In contrast, it will be seen that when the jog switch is released, with the selector 72 in its "auto" position, the cycle will automatically be resumed at exactly the point appropriate to the instant position of the cutters. Full and flexible control of the machine is thus afforded.

I claim as my invention:

1. In a machine of the character described, the combination of a work support for a bar of polygonal cross-section, a tool support adjacent one end of the bar, said supports being mounted for relative rotation about the axis of said bar, a power rotated milling cutter mounted on said tool support for movement toward and away from the bar axis, power driven mechanism for relatively feeding said supports about the bar axis and simultaneously moving said cutter in timed relation toward and away from the bar axis to generate a pyramidal point on the bar, and means controlling said mechanism to increase the rate of feed while said cutter is milling the corners of the bar.

2. In a machine of the type described, the combination of a tapered milling cutter disposed with its axis inclined to and substantially intersecting the axis of a bar whose end portion is to be tapered by the cutter, a first power actuated means for rotating said cutter about its own axis, and a second power actuated means for revolving the cutter bodily about the bar axis at a cyclically varying angular speed varied in timed relation with the angular position of the cutter about the bar axis and for oscillating the cutter bodily toward and away from the bar axis also in timed relation with the cutter movement about the last mentioned axis.

3. In a machine of the type described, the combination of a cutter for removing a layer of metal from about the periphery of a bar work piece which is to be machined, and power actuated means for oscillating said cutter toward and away from the bar axis and for simultaneously revolving the cutter about such axis at a speed which is varied from a maximum when the cutter is displaced a maximum distance from the bar axis in its oscillation to a minimum when the cutter is displaced a minimum distance from the bar axis.

4. In a machine tool, the combination of a movable machine tool element, a power actuated feed mechanism for moving said element at any one of a plurality of rates, cyclic control means governing the operation of said mechanism for automatically changing the feed speed of said element in a predetermined cycle correlated with the integrated travel of said element, and manually operable means for interrupting said cycle at will and causing said element to be fed at a fixed low speed during the interruption and for thereafter restoring control of the feed of said element to said cyclic control means for continuation of the cycle from the point in the latter corresponding to the position of the element at the instant of such restoration of control.

5. In a machine tool, the combination of a movable machine tool element, a power actuated feed mechanism for moving said element at any one of a plurality of rates, cyclic control means for automatically changing the feed speed of said element by said mechanism in a predetermined cycle of changes, a plural-position selector means for rendering said control means operative and inoperative to govern said mechanism, and means including a manual jog control hold-down switch operable upon being held down to cause said mechanism to feed said element at a low rate so long as said switch is held down and irrespective of the setting of said selector means.

6. In a machine of the type described, the combination of a revoluble drum, a pair of supporting members projecting from one end of and mounted in the drum for oscillatory movement toward and away from the drum axis in the course of their rotation with the drum, cutters mounted on the projecting portions of said members to act on the end of a work piece, and guide means for supporting said portions of said members against lateral play while permitting free oscillation thereof toward and away from the drum axis, said guide means including a pair of opposed members rigid with said one end of the drum and presenting guide surfaces to the side faces of said portions of said members.

7. In a machine of the type described, the combination of a revoluble tool head, means on one end of said head defining a guide slot extending diametrically across the same, a tool support having an outboard portion guided in said slot and adapted to carry a metal removing tool, said support having a portion projecting into said head, and power actuated means in said head operable to oscillate the projecting portion of said tool support in said slot toward and away from the axis of head rotation.

HANS T. R. HANITZ.